(12) United States Patent
Brooks

(10) Patent No.: US 6,825,642 B2
(45) Date of Patent: *Nov. 30, 2004

(54) SWITCHING REGULATOR WITH TRANSIENT RECOVERY CIRCUIT

(75) Inventor: Steven W. Brooks, Pomona, CA (US)

(73) Assignee: Microsemi Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/635,426

(22) Filed: Aug. 6, 2003

(65) Prior Publication Data

US 2004/0095104 A1 May 20, 2004

Related U.S. Application Data

(63) Continuation of application No. 10/136,614, filed on Dec. 21, 2001, now Pat. No. 6,605,931, which is a continuation-in-part of application No. 09/708,268, filed on Nov. 7, 2000, now Pat. No. 6,356,063.

(51) Int. Cl.⁷ .................................................. G05F 1/59
(52) U.S. Cl. ........................ 323/272; 323/284; 361/18
(58) Field of Search ............................... 323/272, 282, 323/284, 285; 361/18; 363/55, 56.01

(56) References Cited

U.S. PATENT DOCUMENTS

| | | | | |
|---|---|---|---|---|
| 4,288,831 A | * | 9/1981 | Dolikian | 361/92 |
| 4,302,805 A | * | 11/1981 | Marez et al. | 363/91 |
| 4,447,841 A | * | 5/1984 | Kent | 361/18 |
| 5,029,269 A | * | 7/1991 | Elliott et al. | 363/21.1 |
| 5,180,964 A | * | 1/1993 | Ewing | 323/222 |
| 5,498,995 A | * | 3/1996 | Szepesi et al. | 327/538 |
| 5,777,462 A | * | 7/1998 | Yue | 323/285 |
| 5,818,670 A | * | 10/1998 | Ahn | 361/18 |
| 5,838,145 A | * | 11/1998 | Poon et al. | 323/266 |
| 5,917,716 A | * | 6/1999 | Cho | 363/21.14 |
| 5,930,131 A | * | 7/1999 | Feng | 363/56.03 |
| 5,973,483 A | * | 10/1999 | Jo | 323/222 |
| 5,991,168 A | | 11/1999 | Farrington et al. | 363/16 |
| 6,356,063 B1 | * | 3/2002 | Brooks | 323/284 |
| 6,605,931 B2 | * | 8/2003 | Brooks | 323/272 |
| 6,696,882 B1 | * | 2/2004 | Markowski et al. | 327/531 |

* cited by examiner

*Primary Examiner*—Jeffrey Sterrett
(74) *Attorney, Agent, or Firm*—Knobbe, Martens, Olson & Bear, LLP

(57) ABSTRACT

A transient recovery circuit in a switching regulator responds to relatively quick changes in load currents to suppress output voltage overshoots or undershoots. The transient recovery circuit operates independently of a regular feedback circuit. The transient recovery circuit can be used in a single phase or a multiphase switching regulator. In one embodiment, the transient recovery circuit overrides a control voltage from the regular feedback circuit to control the duty cycle of a pulse-width modulation circuit in the switching regulator during transient conditions. In another embodiment, the transient recovery circuit controls a dedicated transient phase in a multiphase switching regulator. The transient recovery circuit is inactive during non-transient conditions.

10 Claims, 14 Drawing Sheets

SWITCHING REGULATOR WITH TRANSIENT RECOVERY CIRCUIT

RELATED APPLICATION

This application is a continuation of U.S. patent application Ser. No. 10/136,614, filed Dec. 21, 2001 now U.S. Pat. No. 6,605,931, which is a continuation-in-part of U.S. patent application Ser. No. 09/708,268, filed Nov. 7, 2000, now U.S. Pat. No. 6,356,063.

BACKGROUND OF THE INVENTION

1. Field of the Invention

This present invention relates generally to a power conversion circuit and more particularly to a switching regulator with fast transient recovery.

2. Description of the Related Art

A power conversion circuit (e.g., a switching regulator) accepts a Direct Current (DC) voltage source at one level and outputs a desired DC voltage at another level. The switching regulator includes one or more switches, which can be implemented by Metal-Oxide-Semiconductor-Field-Effect-Transistors (MOSFETs). The switches alternate between connecting and disconnecting the voltage source to circuits that drive the output. The duty cycle of the switching determines the output voltage level. The switching is typically controlled by a Pulse-Width Modulation (PWM) circuit.

Switching regulators are useful in high current applications, such as high power microprocessors, Pentium II and Pentium III based applications, notebook computers, desktop computers, network servers, large memory arrays, workstations and DC high power distribution systems, which typically use 15 to 200 amperes. The switching regulator can have multiple parallel channels to process one or more voltage sources to drive a common output. Each channel is substantially identical and includes an inductor. The input terminal of each inductor is switched between the respective voltage source and ground.

The operating speeds of microprocessors are constantly increasing. One method to increase operating speed is to decrease operating voltages. For example, operating voltages of high-speed microprocessors have decreased to 1.5 to 2.0 volts. Correspondingly, the range for operating currents over a short span of time has increased. For example, the operating current can vary between 3 to 35 amperes in a few instruction cycles. Equivalently, the slew rate can be in the order of 30 to 40 amperes per microsecond.

The transient response of typical switching regulators is not satisfactory in applications with demands for high slew rates of output currents. The switching regulator regulates output voltage using a relatively slow feedback circuit which continuously adjusts a control parameter, such as duty cycle. The duty cycle is adjusted in accordance with differences between the output voltage of the switching regulator and a nominal value. Under this approach, the speed of a transient response to a changing output current is limited to ensure stability of the feedback system. Therefore, the output voltage undershoots when the switching regulator cannot respond fast enough to provide more output current, and the output voltage overshoots when the switching regulator cannot respond fast enough to decrease the flow of excess output current.

Although the switching regulator can theoretically achieve faster transient responses by operating at higher frequencies, practical switching devices limit the operating frequencies of the switching regulator. For instance, the inherent impedance of inductors reduces efficiency at high switching frequencies.

The switching regulator can use multiple parallel channels to improve the transient response time without increasing the switching frequency. However, more parts are used, thereby increasing space and cost. Further, the output power capacity of the parallel channels is generally much greater than the power capacity needed by the microprocessor, thereby contributing to inefficiency.

SUMMARY OF THE INVENTION

The present invention solves these and other problems by providing a switching regulator with a transient recovery circuit. The transient recovery circuit responds to relatively quick changes in load currents while a feedback circuit in the switching regulator responds to relatively slow changes in load currents. The transient recovery circuit suppresses overshoots or undershoots (i.e., droops) in the output voltage of the switching regulator when the load changes. The transient recovery circuit quickly adjusts the switching regulator for less output current to overcome an overshoot and quickly adjusts the switching regulator for more output current to overcome an undershoot.

The transient recovery circuit operates independently of the feedback circuit. The feedback circuit does not react to relatively fast changes in load currents due to its slow response. The transient recovery circuit is inactive in the absence of rapid transient conditions, thereby not affecting switching regulator operations during relatively slow changes in load currents. In one embodiment, the transient recovery circuit is disabled during power up or power down.

In one embodiment, the transient recovery circuit sets the switching regulator to operate at minimum duty cycle when the output voltage of the switching regulator increases by more than a first limit in a relatively short period of time. A transient increase in the output voltage indicates a change from a heavy current loading condition to a light current loading condition. Correspondingly, the transient recovery circuit sets the switching regulator to operate at maximum duty cycle when the output voltage of the switching regulator decreases by more than a second limit in the relatively short period of time. A transient decrease in the output voltage indicates a change from a light current loading condition to a heavy current loading condition. The increases or decreases in the output voltage occur when the switching regulator cannot adapt fast enough to the new loading conditions.

The first limit (i.e., the overshoot threshold) and the second limit (i.e., the undershoot threshold) can be the same or different. A user can set or adjust the thresholds. In one embodiment, the threshold is adjusted by changing the value of an external resistor.

The transient recovery circuit includes a comparing reference generator and two detectors. The output voltage of the switching regulator is provided to the two detectors. The output voltage of the comparing reference generator is provided to both detectors. One of the detectors (i.e., the overshoot detector) outputs a high state when the output of the switching regulator is greater than the output of the comparing reference generator by the first limit. The other detector (i.e., the undershoot detector) outputs a high state when the output of the switching regulator is less than the output of the comparing reference generator by the second limit.

In one embodiment, the comparing reference generator is a Low Pass Filter (LPF) with a selected time constant to permit the transient recovery circuit to adapt to a new output voltage. The output voltage of the switching regulator is provided to the input of the LPF. The output of the LPF is provided as a comparing reference voltage to the two detectors. In one embodiment, a buffer amplifier is placed at the output of the LPF to interface with the detectors.

The output of the LPF tracks changes at the input of the LPF when the changes occur over a relatively long time period in view of the selected time constant. However, the output of the LPF does not track changes (i.e., transients) that occur over a relatively short time period. Therefore, the detectors see differences between the switching regulator output voltage and the LPF output voltage during transients, and the transient recovery circuit responds appropriately. The transient recovery circuit also adapts to operation at a new switching regulator output voltage because the LPF output eventually tracks the new switching regulator output voltage.

In an alternate embodiment, the comparing reference generator is a Digital-to-Analog Converter (DAC). The DAC can be digitally programmed to provide a desirable comparing reference voltage to the detectors. For example, the output of the DAC is set to correspond to the expected value of the switching regulator during steady-state operation. In one embodiment, a slow clock is provided to update the DAC.

In one embodiment, the detectors include comparators with hysteresis to prevent high frequency oscillations at the detectors' respective outputs. In another embodiment, the detectors include input stage filters which remove some high frequency noise without interfering with responses to transients.

In one embodiment, the output of the transient recovery circuit is provided to a control input of a PWM circuit. The PWM circuit controls the switching operation of the switching regulator. In one embodiment, a value of zero volts at the control input indicates minimum switching duty cycle while a value of five volts at the control input indicates maximum switching duty cycle. The minimum duty cycle corresponds to minimum regulator output current, and the maximum duty cycle corresponds to maximum regulator output current.

The voltage at the control input of the PWM circuit is generally dominated by the feedback circuit, which responds to relatively slow changes at the switching regulator output. However, the voltage at the control input is dominated by the transient recovery circuit during transients (i.e., relatively fast changes at the switching regulator output). In one embodiment, a high output from the overshoot detector forces the control input low for minimum duty cycle operation, while a high output from the undershoot detector forces the control input high for maximum duty cycle operation. When both detector outputs are low, in the case of normal switching regulator operation, the transient recovery circuit is isolated from the PWM circuit, and the feedback circuit resumes dominance of the control input.

In one embodiment, the output of the overshoot detector in the transient recovery circuit is coupled to the control input of the PWM circuit via a transistor. The transistor conducts when the overshoot detector output is high to thereby pull the control input low to cause a minimum duty cycle operation. When the overshoot detector output is low, the transistor is off, thereby isolating the overshoot detector output from the PWM circuit control input.

The output of the undershoot detector in the transient recovery circuit is coupled to the control input of the PWM circuit via a diode in one embodiment. When the undershoot detector output is high, the diode conducts and drives the control input high to cause a maximum duty cycle operation. When the undershoot detector output is low, the diode is off, thereby isolating the undershoot detector output from the PWM circuit control input.

In one embodiment, the switching regulator has multiple parallel channels (i.e., multiple phases). Each phase has a respective PWM circuit. The detectors' respective outputs are provided to each PWM circuit with respective pairs of transistors and diodes. The transistors and diodes isolate the control inputs of respective phases when the transient recovery circuit is inactive (i.e., when the detector outputs are low).

In an alternate embodiment, the detectors' respective outputs are provided to one or more dedicated phases. The one or more dedicated phases use inductors with smaller values than inductors used in the other phases. Less inductance allows the one or more dedicated phases to respond relatively quicker to rapid transients in the output current.

DETAILED DESCRIPTION OF THE INVENTION

Figure 1:
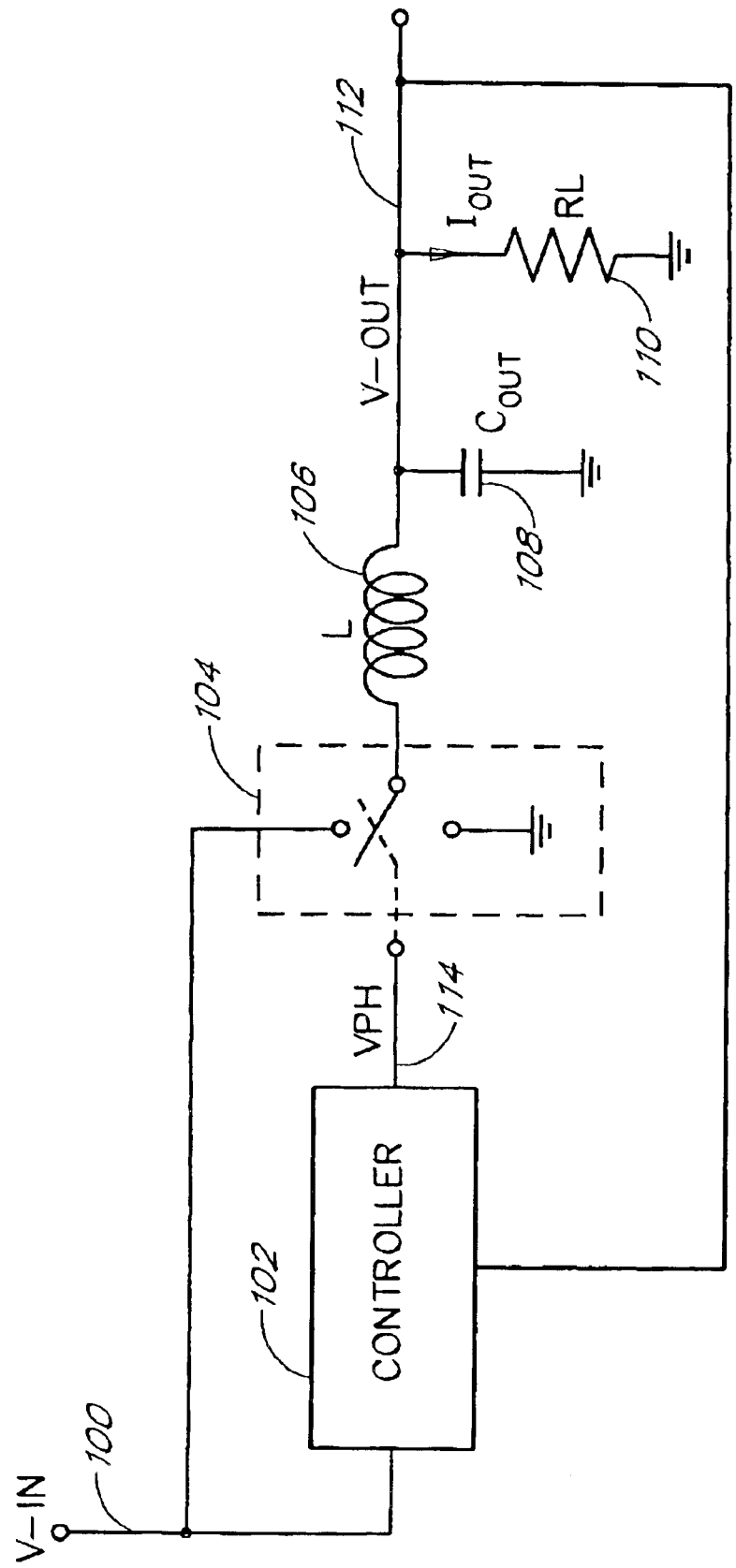
FIG. 1 is a schematic diagram of a switching regulator.

Embodiments of the present invention will be described hereinafter with reference to the drawings. FIG. 1 is a schematic diagram of a switching regulator 10. A voltage source (V-IN) is provided to a controller 102 and to a switch 104 via an input voltage bus 100 to establish an output voltage (V-OUT) on an output line 112. The controller 102 outputs a rectangular wave voltage (VPH) on a control line 114 to control the operation of the switch 104 which alternately connects the input terminal of an inductor 106 to the input voltage and to ground. The output terminal of the inductor 106 is coupled to the output line 112. An output capacitor ($C_{OUT}$) 108 is connected between the output line 112 and ground. A load resistance (RL) 110, representative of an output load, is also connected between the output line 112 and ground. The output voltage (V-OUT) is provided as an input to the controller 102 for feedback and transient recovery.

The switching regulator 10 is typically used in high output current applications because of its efficient architecture. Minimal power is dissipated by the switching regulator 10 because the output current (i.e., $I_{OUT}$) encounters relatively lossless elements, such as the inductor 106 and the output capacitor 108. Some power is dissipated by the controller 102. However, the magnitude of the current used by the controller 102 is typically hundreds to thousands times less than the output current so the overall efficiency is not affected.

The rectangular wave voltage on the control line 114 controls the switch 104. For example, when the rectangular wave voltage is in a high state, the output of the switch 104 is connected to ground. When the rectangular wave voltage is in a low state, the output of the switch 104 is connected to the input voltage. Thus, the voltage waveform applied to the input terminal of the inductor 106 alternates between the input voltage and ground with the same duty cycle as the rectangular wave voltage on the control line 114. The inductor 106 and the output capacitor 108 combine to act as a LPF to provide a substantially constant output voltage at the output line 112. The level of the output voltage is the average value of the voltage waveform applied to the inductor 106. Thus, for a given load resistance (RL) 110, the output voltage varies linearly with the duty cycle of the rectangular wave voltage.

Furthermore, the duty cycle of the rectangular wave voltage generated by the controller 102 changes to maintain substantially the same output voltage for different load resistances 110 (i.e., different load currents). In a typical high-speed processor, the slew rates of load currents can be high. The controller 102 responds quickly to overcome overshoots or undershoots in the transient voltage response.

Figure 2:
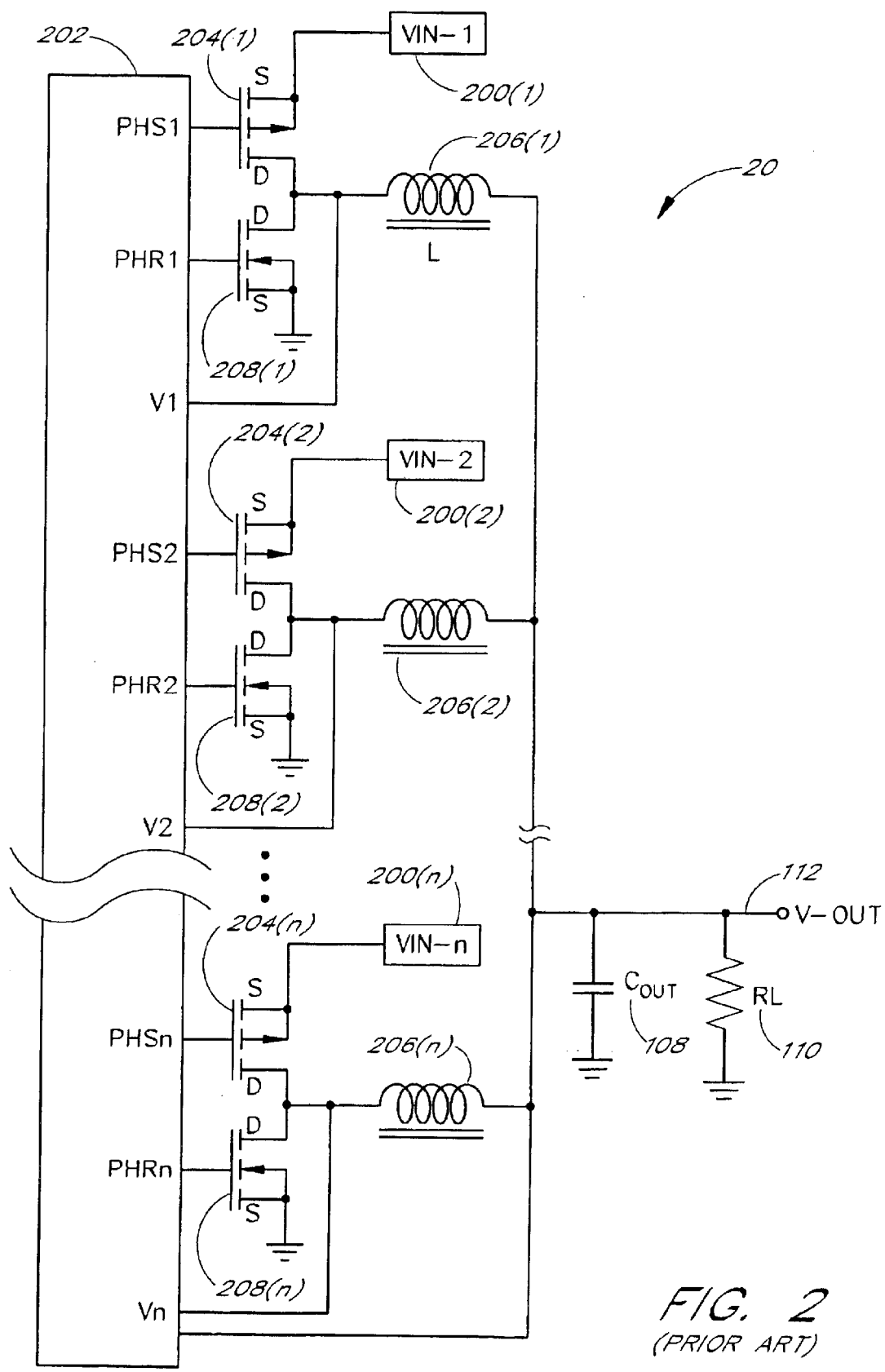
FIG. 2 is a schematic diagram of one embodiment of a multiphase switching regulator.

FIG. 2 is a schematic diagram of one embodiment of a multiphase switching regulator 20 which uses n identical channels (i.e., phases) to process input voltages from n voltage sources, shown as 200(1)–200(n) (collectively the voltages sources 200). In one embodiment, the voltages from the voltage sources 200 are the same. In an alternate embodiment, the voltage sources 200 are independent from each other and may generate different voltages. The voltages from the voltage sources 200 are provided to respective source terminals of n P-MOSFETs, shown as P-MOSFETs 204(1)–204(n) (collectively the P-MOSFETs 204). The drain terminals of the P-MOSFETs 204 are connected to the drain terminals of n respective N-MOSFETs, shown as N-MOSFETs 208(1)–208(n) (collectively the N-MOSFETs 208). The source terminals of the N-MOSFETs 208 are connected to ground. The body terminals of the N-MOSFETs 208 and the P-MOSFETs 204 are connected to their respective source terminals.

The multiphase controller 202 provides n rectangular wave voltages (PHS1-PHSn) to drive the gate terminals of the respective P-MOSFETs 204. The multiphase controller 202 also provides n rectangular wave voltages (PHR1-PHRn) to drive the gate terminals of the respective N-MOSFETs 208. The drain terminals of the P-MOSFETs 204 and the N-MOSFETs 208 are connected to the input terminals of n respective inductors shown as 206(1)–206(n) (collectively the inductors 206). The output terminals of the inductors 206 are commonly connected to provide the output voltage (V-OUT) on the output line 112. The output capacitor 108 is connected between the output line 112 and ground. The load resistance 110 is also connected between the output line 112 and ground. In one embodiment, the voltages V1-Vn at the input terminals of the respective inductors 206 are provided as feedback voltages to the multiphase controller 202 to control current sharing between the phases. The output voltage (V-OUT) on the output line 112 is provided as an input to the multiphase controller 202 for feedback and transient recovery.

The P-MOSFETs 204 and the N-MOSFETs 208 function as switches that alternately connect the respective inductors 206 to the respective voltage sources 200 and ground. For example, when the voltages on the gate terminals of the P-MOSFETs 204 are low, the P-MOSFETs 204 conduct and connect the input terminals of the respective inductors 206 to the respective voltage sources 200. When the voltages on the gate terminals of the N-MOSFETs 208 are high, the N-MOSFETs 208 conduct and connect the input terminals of the respective inductors 206 to ground. The function of the P-MOSFETs 204 can be implemented by N-MOSFETs with appropriate changes to the drivers in the multiphase controller 202. The voltages on the gate terminals are timed so that the P-MOSFETs 204 and the N-MOSFETs 208 connected to a particular inductor 206 are not conducting at the same time.

Figure 3:
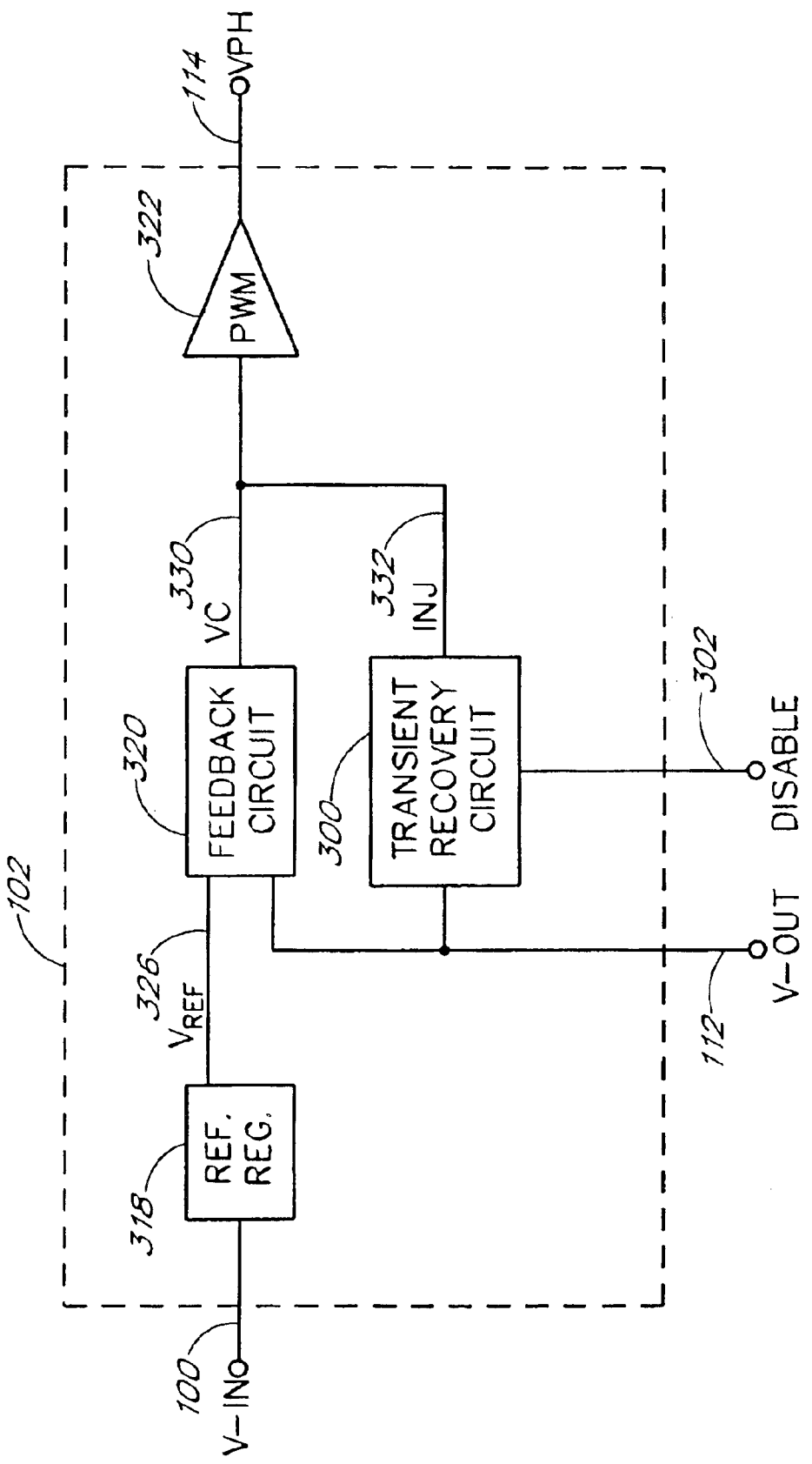
FIG. 3 is a block diagram of one embodiment of a controller with a transient recovery circuit.

FIG. 3 is a block diagram of one embodiment of a controller 102 with a transient recovery circuit 300 to respond quickly to load current changes, thereby suppressing overshoots or undershoots in output voltage transient responses. The controller 102 includes a reference regulator 318, a feedback circuit 320, and a PWM circuit 322 in addition to the transient recovery circuit 300.

The reference regulator 318 accepts an input from the voltage source via the input voltage bus 100 and generates a reference voltage ($V_{REF}$) on a line 326 for the feedback circuit 320. The feedback circuit 320 generates a control voltage (VC) on a line 330 based on the reference voltage and the output voltage of the switching regulator 10. For example, the feedback circuit 320 generates a control voltage by comparing the reference voltage to a fraction of the output voltage.

The control voltage (VC) is provided to an input of the PWM circuit 322, which generates the rectangular wave voltage (VPH) to control the switching operation of the switching regulator 10, thereby controlling the output voltage. In one embodiment, a high control voltage (VC) corresponds to maximum duty cycle operation for the switching regulator 10, while a low control voltage (VC) corresponds to minimum duty cycle operation for the switching regulator 10. For example, in a particular embodiment, a high voltage is five volts while a low voltage is zero volts. Thus, the control voltage (VC) has a voltage level between zero and five volts.

The feedback circuit 320 typically responds relatively slowly to changes in the output voltage to ensure stability of the feedback system. The transient recovery circuit 300 improves transient responses of the switching regulator 10. The transient recovery circuit 300 monitors the output voltage and provides an inject signal (INJ) on a line 332 to the input of the PWM circuit 322. The inject signal (INJ) overrides the control voltage from the feedback circuit 320 when the transient recovery circuit 300 responds to output voltage transients caused by relatively quick changes in load currents. For example, the inject signal (INJ) can pull the input of the PWM circuit 322 high or low to suppress respective overshoots or undershoots regardless of the value of the control voltage (VC).

During other times, the inject signal (INJ) floats to effectively disconnect the transient recovery circuit 300 from the input of the PWM circuit 322, thereby allowing the feedback circuit 320 to regulate the output voltage in a stable manner. In one embodiment, a disable signal (DISABLE) on a line 302 shuts down the transient recovery circuit 300 during power up or power down of the switching regulator 10. For example, the disable signal removes power to some components in the transient recovery circuit 300, thereby rendering the transient recovery circuit 300 inactive.

Figure 4:
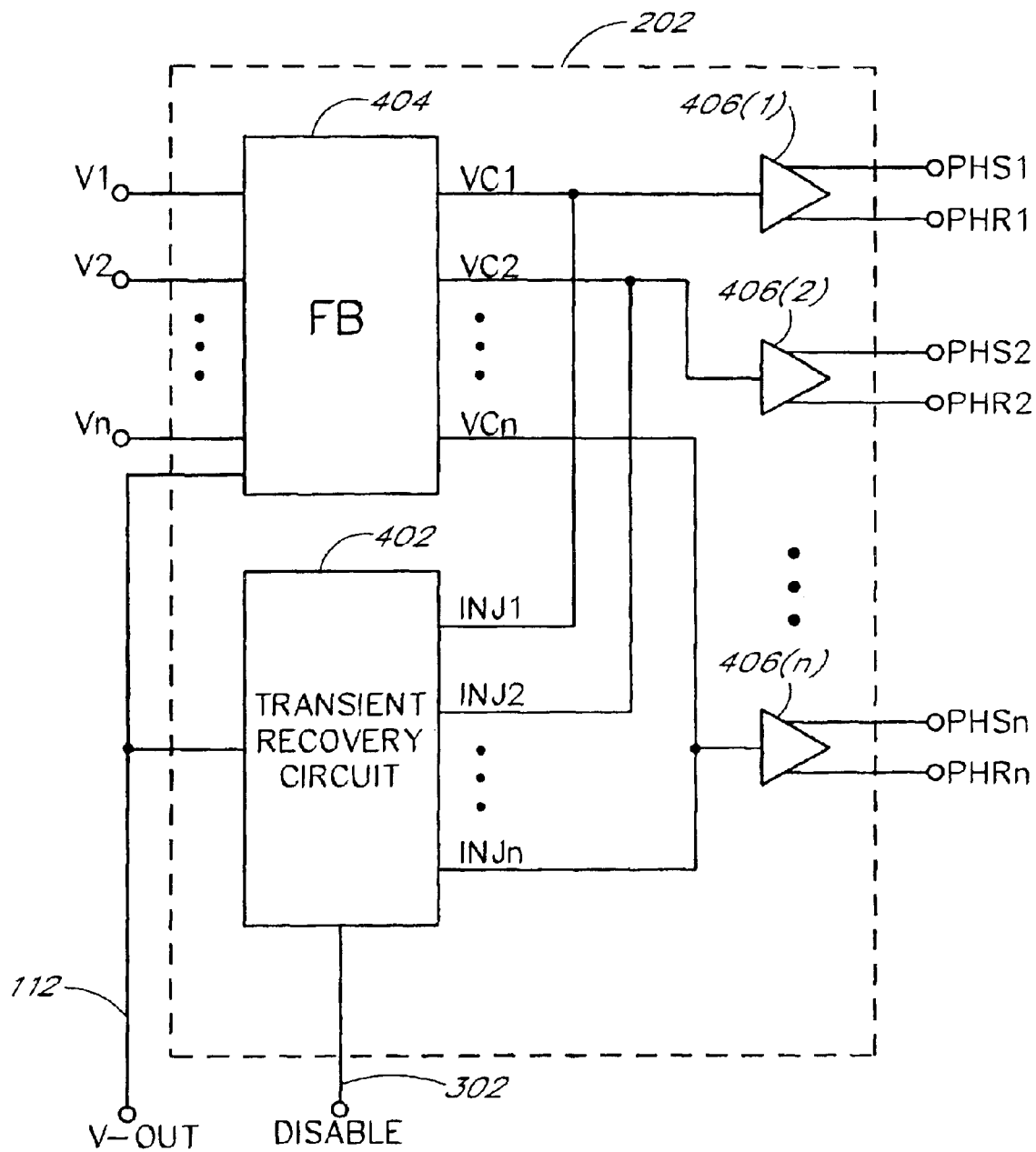
FIG. 4 is a block diagram of one embodiment of a multiphase controller with a multiphase transient recovery circuit.

FIG. 4 is a block diagram of one embodiment of a multiphase controller 202 with a multiphase transient recovery circuit 402. The multiphase controller 202 includes a multiphase feedback (FB) circuit 404 and n PWM circuits shown as PWM circuits 406(1)–406(n) (collectively the PWM circuits 406) in addition to the multiphase transient recovery circuit 402.

The multiphase feedback circuit 404 receives the output voltage and n feedback voltages V1-Vn to generate n control voltages (VC1-VCn) for the respective PWM circuits 406. In one embodiment, the feedback voltages establish forced current sharing among the multiple phases. The PWM circuits 406 generate respective pairs of rectangular wave voltages (PHS1, PHR1 . . . PHSn, PHRn). In one embodiment, the rectangular wave voltages of each pair (PHS, PHR) are substantially identical and have identical phases. The phases between different pairs of the rectangular wave voltages are different. The rectangular wave voltages drive the respective switches 204, 208 of the multiphase switching regulator 20 (see FIG. 2). The control voltages control the duty cycles of the switches in the multiphase switching regulator 20.

The multiphase transient recovery circuit 402 receives the output voltage (V-OUT) and generates n inject signals (INJ1-INJn) which are coupled to the respective control voltages at the inputs of the PWM circuits 406. Similar to the transient recovery circuit 300, the inject signals override the control voltages (VC1-VCn) when the multiphase transient recovery circuit 402 is active. When the multiphase transient recovery circuit 402 is inactive, the inject signals float to thereby allow the control voltages to dominate the voltages at the inputs of the respective PWM circuits 406.

The multiphase transient recovery circuit 402 is active during rapid transient conditions in the output voltage (V-OUT) in response to changing load conditions. The multiphase feedback circuit 404 typically does not respond quickly to the transients since it is designed for a slow stable response to regulate the output voltage. By reacting relatively quickly to rapid transients in the output voltage, the multiphase transient recovery circuit 402 suppresses overshoots or undershoots in the output voltage.

In one embodiment, the multiphase transient recovery circuit 402 causes the multiphase switching regulator 20 to operate at maximum duty cycle in response to an undershoot and at minimum duty cycle in response to an overshoot. The undershoot in the output voltage indicates a change from a light load current to a heavy load current. The overshoot in the output voltage indicates a change from a heavy load current to a light load current. In another embodiment, the disable signal (DISABLE) disables the multiphase transient recovery circuit 402 during power up or power down of the multiphase switching regulator 20.

In an alternate embodiment, the multiphase transient recovery circuit 402 generates less inject signals than the number of phases in the multiphase switching regulator 20. For example, the multiphase transient recovery circuit 402 generates only one inject signal to control the switch of a dedicated phase for transient suppression. The dedicated phase uses an inductor which is much smaller (e.g., one tenth smaller) than the inductors of the other phases to respond quickly to rapid transients which occur in less than a microsecond.

Figure 5:
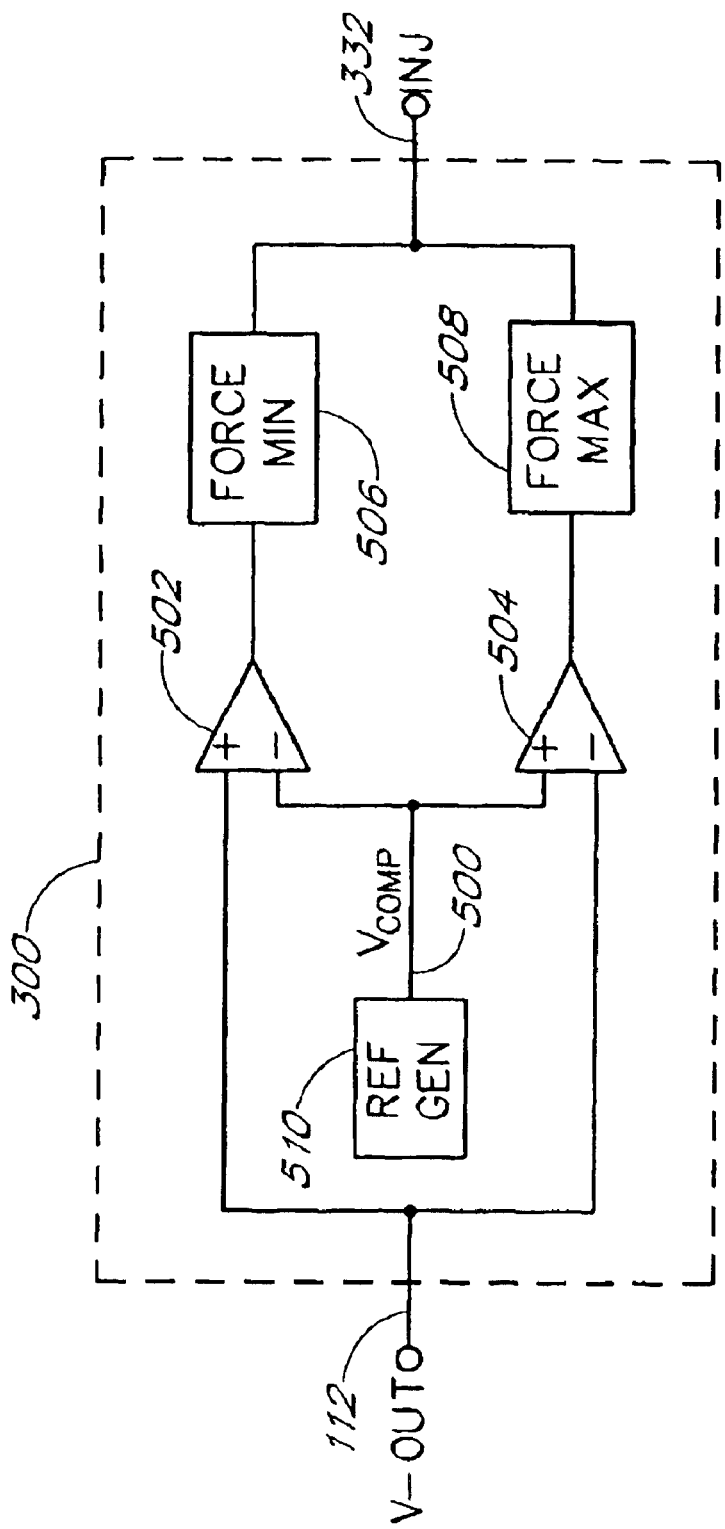
FIG. 5 is a block diagram of one embodiment of a transient recovery circuit.

FIG. 5 is a block diagram of one embodiment of a transient recovery circuit 300. The transient recovery circuit 300 includes a comparing reference generator 510, an overshoot detector 502, an undershoot detector 504, a force minimum unit 506, and a force maximum unit 508.

The comparing reference generator 510 generates a comparing voltage (VCOMP) 500 which is provided to the inverting input of the overshoot detector 502 and to the non-inverting input of the undershoot detector 504. The output voltage (V-OUT) is provided as an input to the non-inverting input of the overshoot detector 502 and to the inverting input of the undershoot detector 504. When the output voltage is above the comparing voltage 500 by a first limit, the output of the overshoot detector 502 is high. When the output voltage is below the comparing voltage 500 by a second limit, the output of the undershoot detector 504 is high. Otherwise, the outputs of respective detectors are low.

When the output of the overshoot detector 502 is high, the force minimum unit 506 configures the inject signal (INJ) to cause minimum duty cycle operation of the switching regulator 10. When the output of the undershoot detector 504 is high, the force maximum unit 508 configures the inject signal (INJ) to cause maximum duty cycle operation of the switching regulator 10. In one embodiment, a value of zero volts applied to the PWM 322 (FIG. 3) corresponds to minimum duty cycle operation, while a value of five volts applied to the PWM 322 corresponds to maximum duty cycle operation. Therefore, the force minimum unit 506 pulls the inject signal (INJ) low when the overshoot detector 502 is high. Correspondingly, the force maximum unit 508 drives the inject signal (INJ) high when the undershoot detector 504 is high. When both of the detector outputs are low, the force minimum unit 506 and the force maximum unit 508 are inactive, thereby allowing the inject signal (INJ) to float and thus allowing the control signal (VC) to determine the duty cycle of the PWM 322.

Figure 6:
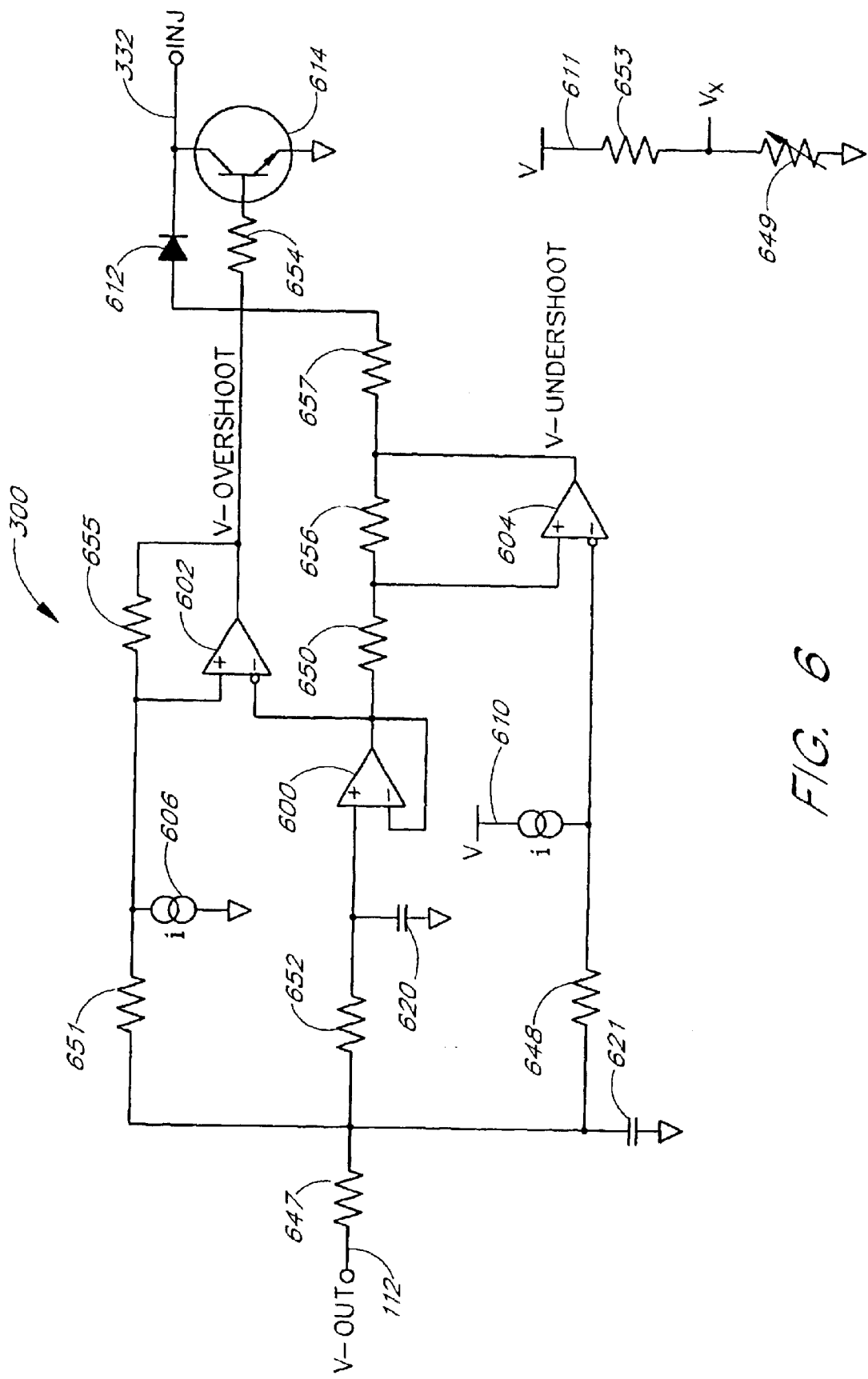
FIG. 6 is a schematic diagram of one embodiment of the transient recovery circuit shown in FIG. 5.

FIG. 6 is a schematic diagram of one embodiment of the transient recovery circuit 300 shown in FIG. 5. The transient recovery circuit 300 includes a buffer amplifier 600, two comparators 602, 604, a diode 612, a transistor 614, and other components discussed below. The embodiment of FIG. 6 permits the transient recovery circuit 300 to adapt to a new regulator output voltage if the output voltage is slowly changed, while continuing to suppress unwanted rapid transients.

The output voltage (V-OUT) of the switching regulator 10 is provided as an input to the non-inverting input of the first comparator (i.e., the overshoot comparator) 602 via series resistors 647, 651. The output voltage is provided as an input to the inverting input of the second comparator (i.e., the undershoot comparator) 604 via the resistor 647 in series with a resistor 648. A capacitor 621 is connected between the common node of the resistors 647, 651, 648 and ground. In one embodiment, the resistor 647, the capacitor 621, and the resistor 651 combine to form an input RC-filter to reduce high frequency noise of the output voltage before feeding it to the non-inverting input of the overshoot comparator 602. Likewise, the resistor 648 in combination with the resistor 647 and the capacitor 621 filter high frequency noise for the inverting input of the undershoot comparator 604.

The output voltage (V-OUT) is also provided to a non-inverting input of the buffer amplifier 600 via a resistor 652 in series with the resistor 647. A capacitor 620 is coupled between the non-inverting input of the buffer amplifier 600 and ground. The resistors 647, 652 and the capacitor 620 form a LPF with a selected time constant. The voltage at the non-inverting input of the buffer amplifier 600 (i.e., the output of the LPF) tracks changes in the output voltage when the changes occur relatively slowly in relation to the selected time constant.

At the same time, the output of the LPF does not track changes (i.e., rapid transients) that occur over a relatively short time period. For example, the voltage at the output of the LPF with a time constant of 2.5 milliseconds does not change during transients that last in the order of 10 microseconds. In one embodiment, the buffer amplifier 600 is configured for unity gain. Therefore, the output of the buffer amplifier 600 is equivalent to the output of the LPF. Thus, the output of the buffer amplifier 600 tracks relatively slow changes in the output voltage but does not immediately track relatively quick changes, such as transients. The combination of the LPF and the buffer amplifier 600 is equivalent to the comparing reference generator 510 of FIG. 5.

The output of the buffer amplifier 600 is provided to the inverting input of the overshoot comparator 602. The output of the buffer amplifier 600 is also provided to the non-inverting input of the undershoot comparator 604 via a series resistor 650. The buffer amplifier 600 provides a low impedance output to suppress interaction between the comparators 602, 604. A first resistor 655 is coupled between the output and the non-inverting input of the overshoot comparator 602 to set the hysteresis of the overshoot comparator 602. A second feedback resistor 656 is coupled between the output and the non-inverting input of the undershoot comparator 604 to set the hysteresis of the undershoot comparator 604.

A first current source 606 is coupled between the non-inverting input of the overshoot comparator 602 and ground. The current source 606 establishes an overshoot limit by fixing the voltage drop across the resistors 647 and 651 in the overshoot circuit. A second current source 608 is coupled between the inverting input of the undershoot comparator and a DC voltage (V) on a line 610. The current source 608 establishes an undershoot limit by fixing the voltage drop across the resistors 647 and 648 in the undershoot circuit. The DC voltage (V) on the line 610 is equal to or greater than the highest anticipated output voltage (V-OUT).

In one embodiment, the current sources 606, 608 are variable. The current source 608 is a voltage controlled current source wherein a voltage (Vx) determines the current level of the current source 608. In one embodiment, the voltage (Vx) is generated by a resistor divider pair. The resistor divider pair includes an external setting resistor 649 connected to a DC voltage on a line 611 through a series resistor 653. The value of the external setting resistor 649 can be varied to adjust the level of the voltage (Vx), thereby adjusting the current level of the current source 608. In one embodiment, the first current source 606 mirrors the second current source 608 to establish equivalent levels in the overshoot limit and the undershoot limit.

The output of the overshoot comparator 602 switches to a high level when the output voltage increases by more than the overshoot limit in a relatively short period of time. The overshoot limit is the voltage drop across the resistors 647, 651 that is attributable to the first current source 606. The output of the undershoot comparator 604 switches to a high level when the output voltage decreases by more than the undershoot limit in a relatively short period of time. The undershoot limit is the voltage drop across the resistors 647, 648 that is attributable to the second current source 608.

The output of the overshoot comparator 602 is provided to the base terminal of an NPN transistor 614 through a series resistor 654. The emitter terminal of the transistor 614 is connected to ground. The collector terminal of the transistor 614 is coupled to the inject signal (INJ) on the line 332. When the output of the overshoot comparator 602 is high, the transistor 614 turns on to pull the inject signal (INJ) low. When the output of the overshoot comparator 602 is low, the transistor 614 turns off to effectively disconnect the overshoot comparator 602 from the inject signal (INJ).

The output of the undershoot comparator 604 is provided to the anode of a diode 612 through a series resistor 657. The cathode of the diode 612 is coupled to the inject signal (INJ) on the line 332. When the output of the undershoot comparator 604 is high, the diode 612 is forward biased to drive the inject signal (INJ) high. When the output of the undershoot comparator 604 is low, the diode 612 is reverse biased to effectively isolate the undershoot comparator 604 from the inject signal (INJ).

Thus, the inject signal (INJ) is driven high when the undershoot comparator 604 detects a transient drop in the output voltage (V-OUT), and the inject signal (INJ) is pulled low when the overshoot comparator 602 detects a transient increase in the output voltage. Under other conditions, the comparators 602, 604 do not affect the level of the inject signal (INJ), and the output impedance of the transient recovery circuit 300 is high. In one embodiment, the overshoot comparator 602 and the undershoot comparator 604 have hysteresis to minimize high frequency oscillations at the outputs of the comparators 602, 604.

A disable circuit is not shown in FIG. 6 but someone skilled in the art would appreciate that nodes can be pulled low to prevent the diode 612 or the transistor 614 from turning on.

Figure 7:
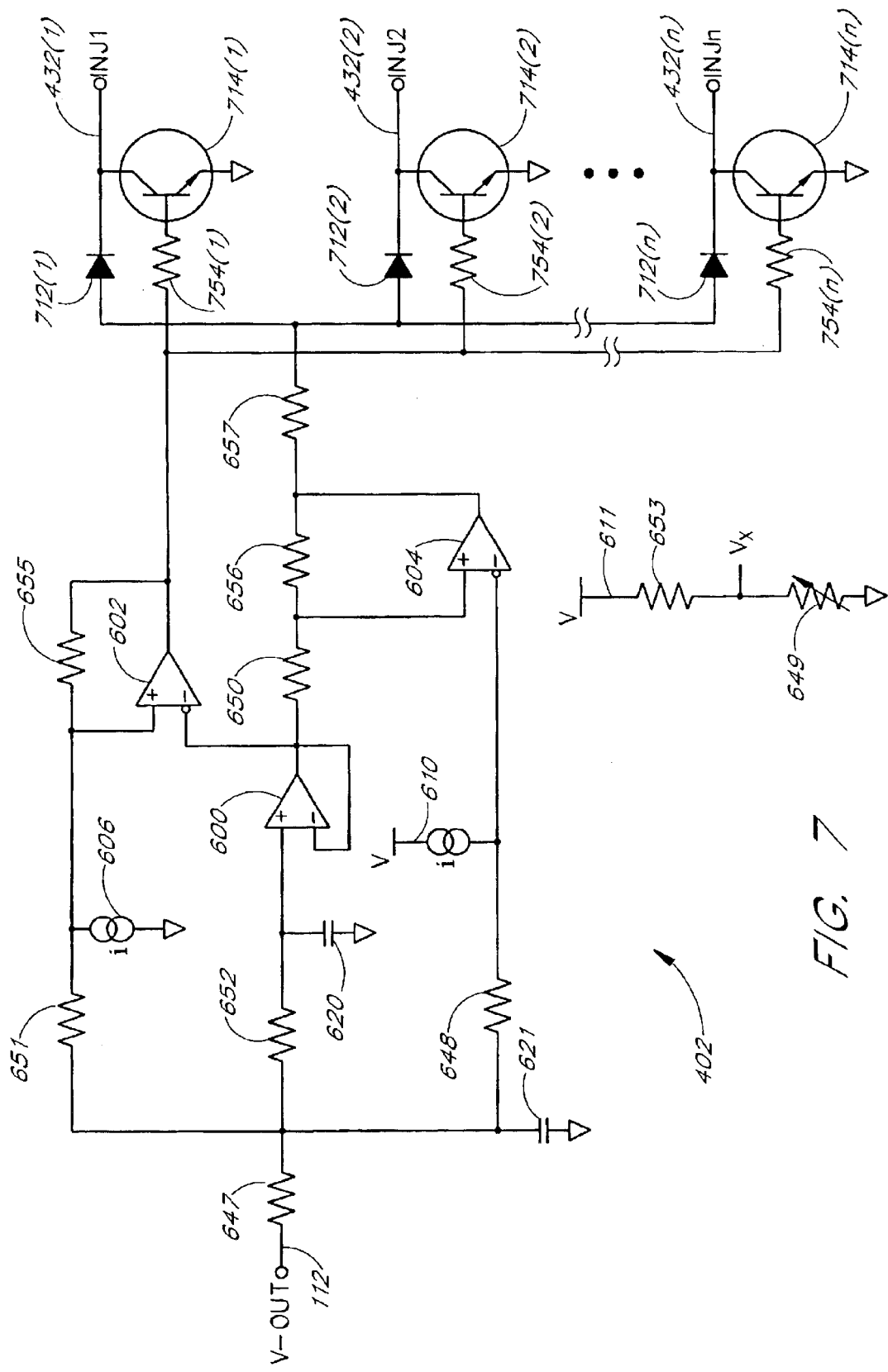
FIG. 7 is a schematic diagram of one embodiment of the multiphase transient recovery circuit.

FIG. 7 is a schematic diagram of one embodiment of the multiphase transient recovery circuit 402. The multiphase transient recovery circuit 402 utilizes the basic structure of the transient recovery circuit 300 and includes n diodes, shown as diodes 712(1)–712(n) (collectively the diodes 712), n transistors, shown as transistors 714(1)–714(n) (collectively the transistors 714), and n base resistors, shown as resistors 754(1)–754(n) (collectively the base resistors 754).

The output of the undershoot comparator 604 is coupled to the anodes of the diodes 712 via the series resistor 657. The cathodes of the diodes 712 are coupled to the respective inject signals 432. The output of the overshoot comparator 602 is coupled to the base terminals of the transistors 714 through the respective base resistors 754. The emitter terminals of the transistors 714 are connected to ground. The collector terminals of the transistors 714 are coupled to the respective inject signals 432.

The inject signals (INJ1 . . . INJn) are coupled to the inputs of the respective PWM circuits 406 in the multiphase switching regulator 20 to control the duty cycles of the respective phases during transient conditions. The multiphase transient recovery circuit 402 affects the phases equally. The diodes 712 and the transistors 714 have high output impedances during non-transient conditions to isolate the multiphase transient recovery circuit 402 from other circuits in the multiphase switching regulator 20, and to isolate the phases from each other.

Figure 8:
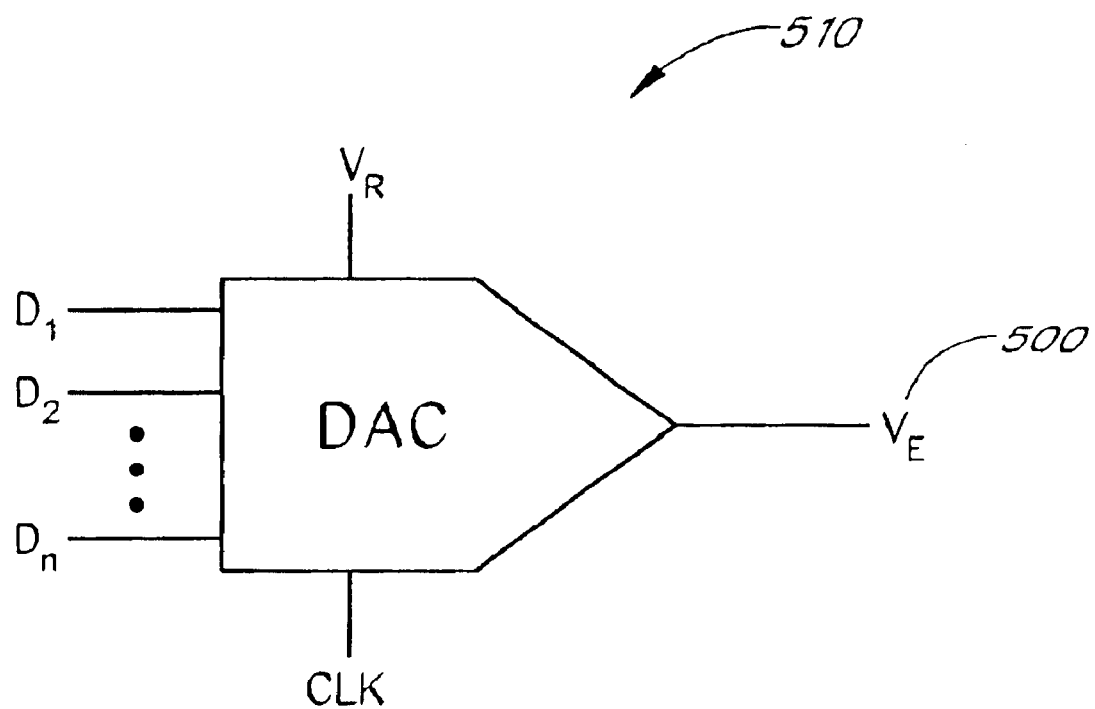
FIG. 8 is a schematic of one embodiment of a comparing reference generator.

FIG. 8 is a schematic of one embodiment of a comparing reference generator 510 of FIG. 5 in which a comparing voltage (VCOMP) is generated for the overshoot detector 502 and the undershoot detector 504. A DAC 800 provides the comparing voltage ($V_E$) 500 to the detectors 502, 504. For example, the comparing voltage 500 is the expected value of the output voltage (V-OUT). The output of the DAC 800 is generated with a voltage reference ($V_R$) and digital bits ($D_1$–$D_n$). In one embodiment, the digital bits change with time, and a clock signal (CLK) is provided to update the output of the DAC 800.

Figure 9:
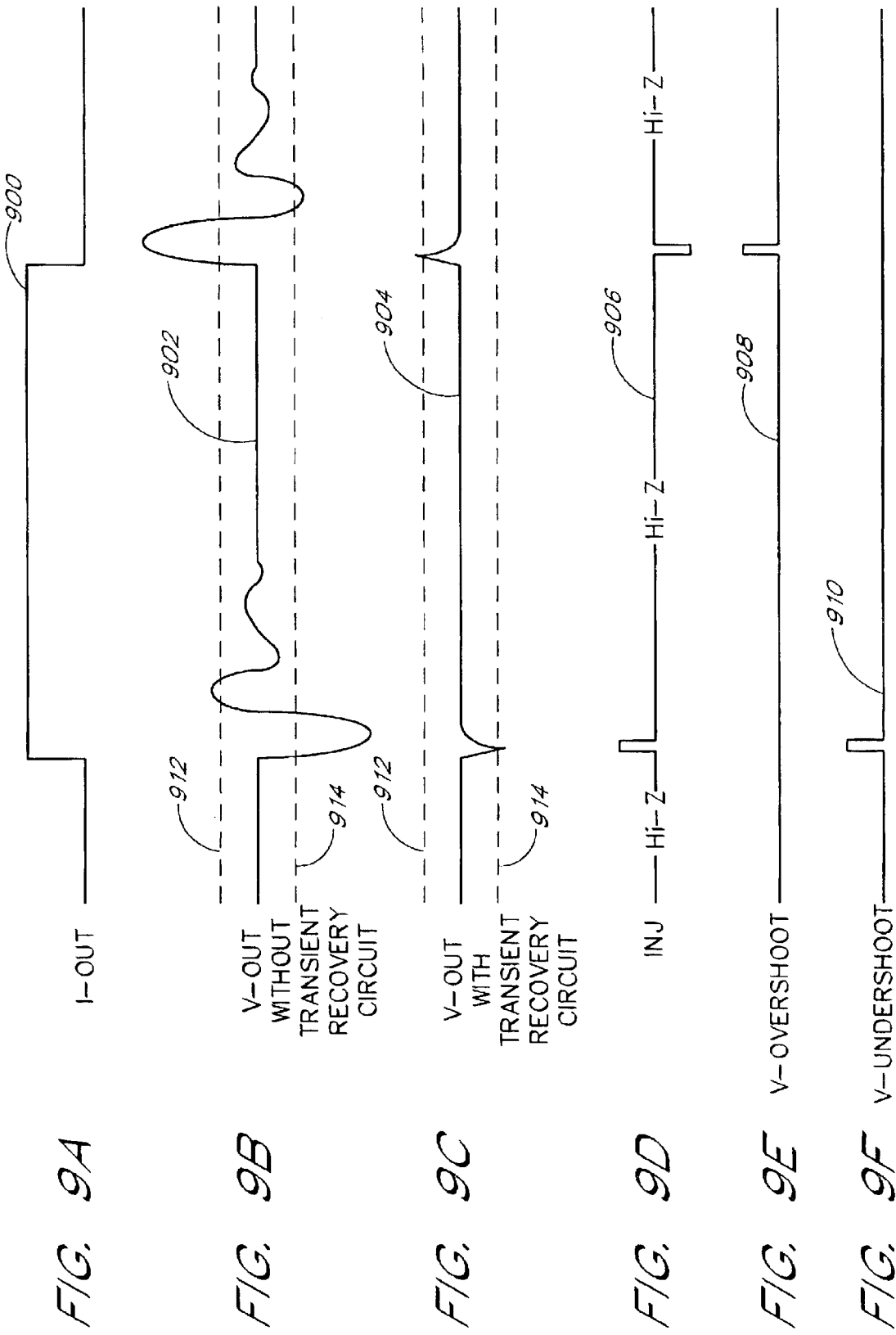
FIGS. 9A–9F illustrate waveforms of voltages generated by the transient recovery circuit in the embodiment of FIG. 6.

FIGS. 9A–9F illustrate waveforms of voltages generated by the transient recovery circuit 300 in the embodiment of FIG. 6. A graph 900 in FIG. 9A represents the output current ($I_{OUT}$) as a function of time. A graph 902 in FIG. 9B illustrates the corresponding output voltage (V-OUT) in the absence of the transient recovery circuit 300. A graph 904 in FIG. 9C illustrates the corresponding output voltage (V-OUT) of a switching regulator 10 with the transient recovery circuit 300. In FIGS. 9B and 9C, dash lines 912, 914 indicate respective upper and lower acceptable limits of the output voltage. A graph 906 in FIG. 9D represents the inject signal (INJ) as a function of time. A graph 908 in FIG. 9E represents the corresponding output (V-OVERSHOOT) of the overshoot comparator 602, and a graph 910 in FIG. 9F represents the corresponding output (V-UNDERSHOOT) of the undershoot comparator 604.

When the output current suddenly increases, the output voltage of a switching regulator 10 without a transient recovery circuit 300 undershoots because the switching regulator 10 fails to response quickly to provide the increased current. Similarly, the output voltage overshoots momentarily when the output current suddenly decreases because the switching regulator 10 fails to decrease its output current fast enough.

The transient recovery circuit 300 minimizes the undershoot and the overshoot as shown in the graph 904 by reacting to changes in the output voltage (V-OUT) quickly. For example, when the output voltage decreases by more than a limit defined by the lower limit 914, the transient recovery circuit 300 outputs a high inject signal (INJ) to operate the switching regulator 10 at maximum duty cycle. Similarly, the transient recovery circuit 300 outputs a low inject signal (INJ) to operate the switching regulator 10 at minimum duty cycle when the output voltage increases by more than a limit defined by the upper limit 912. The high inject signal (INJ) corresponds to a high at the output of the undershoot comparator 604 while the low inject signal (INJ) corresponds to a high at the output of the overshoot comparator. When the output voltage is within the bounds of the upper and the lower limits, the inject signal (INJ) is in a high impedance state (Hi-Z) to effectively isolate the transient recovery circuit 300 from other circuits in the switching regulator 10.

Figure 10:
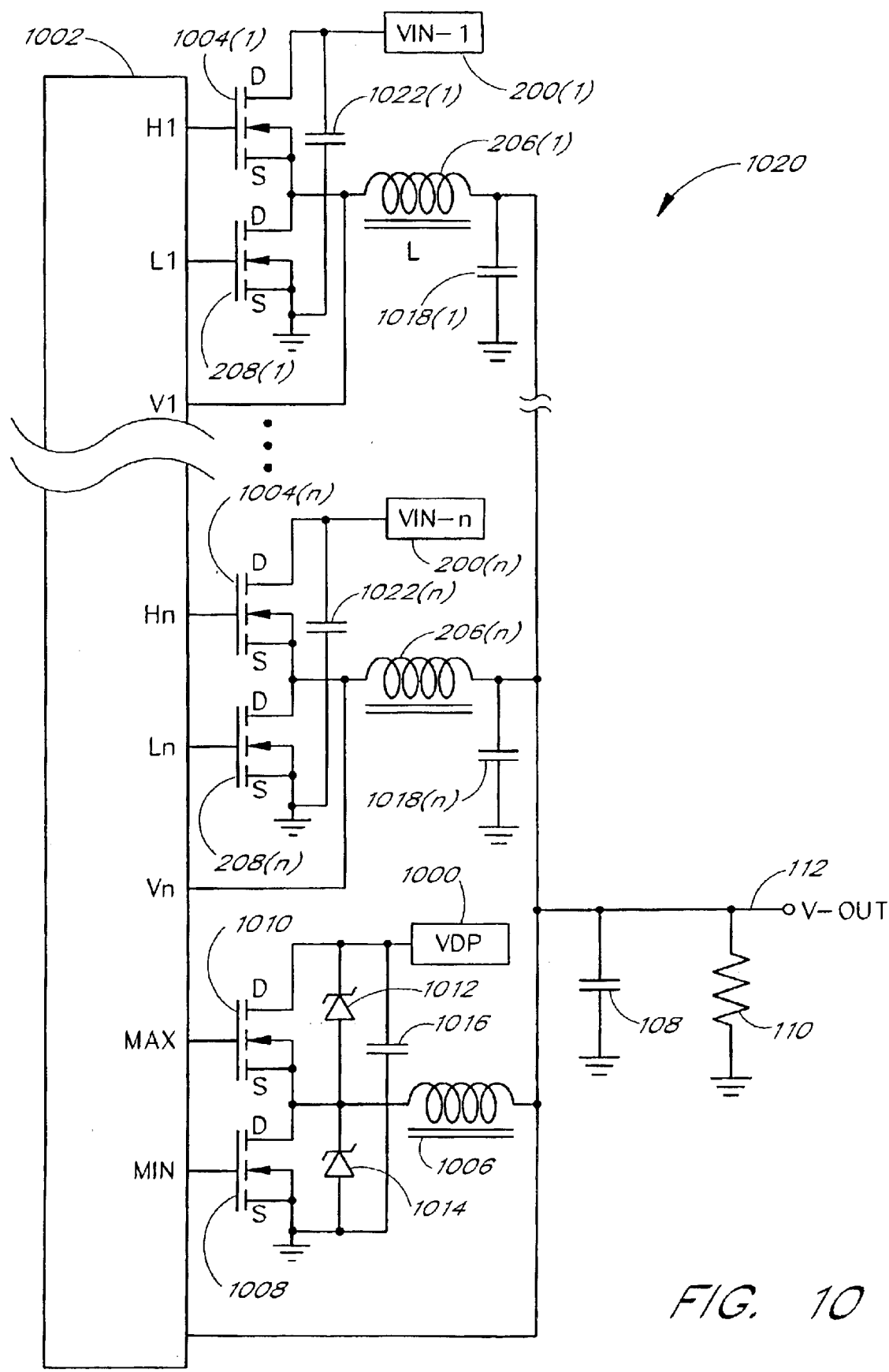
FIG. 10 is a schematic diagram of an alternate embodiment of a multiphase switching regulator.

FIG. 10 is a schematic diagram of an alternate embodiment of a multiphase switching regulator 1020 which includes a dedicated transient phase. Similar to the multiphase switching regulator 20 shown in FIG. 2, n identical phases process input voltages from n voltage sources, shown as 200(1)–200(n) (collectively the voltages sources 200). In addition, a dedicated transient phase is coupled to a dedicated phase voltage source (VDP) 1000 to aid the multiphase switching regulator 1020 in transient recovery. In one embodiment, the voltages from the voltage sources 200 are the same. In an alternate embodiment, the voltage sources 200 are independent from each other and may generate different voltages. Furthermore, the dedicated phase voltage source 1000 may be the same as one or more of the voltage sources 200 or may be independent from all the voltage sources 200.

In one embodiment, the switches of the multiphase switching regulator 1020 are realized using N-MOSFETs. For example, the voltages from the voltage sources 200 are provided to respective drain terminals of n N-MOSFETs, shown as N-MOSFETs 1004(1)–1004(n) (collectively the top N-MOSFETs 1004). Source terminals of the top N-MOSFETs 1004 are connected to drain terminals of n respective N-MOSFETs, shown as N-MOSFETs 208(1)–208(n) (collectively the bottom N-MOSFETs 208). The source terminals of the bottom N-MOSFETs 208 are connected to ground. Similarly, the dedicated phase voltage source 1000 is provided to a drain terminal of N-MOSFET 1010. A source terminal of the N-MOSFET 1010 is connected to the drain terminal of N-MOSFET 1008. A source terminal of the N-MOSFET 1008 is connected to ground. The body terminals of the bottom N-MOSFETs 208, the top N-MOSFETs 1004, and the dedicated phase N-MOSFETs 1008, 1010 are connected to their respective source terminals.

A multiphase controller 1002 provides n rectangular wave voltages (H1-Hn) to drive the gate terminals of the respective top N-MOSFETs 1004. The multiphase controller 1002 also provides n rectangular wave voltages (L1-Ln) to drive the gate terminals of the respective bottom N-MOSFETs 208. The source terminals of the top N-MOSFETs 1004 and the drain terminals of the bottom N-MOSFETs 208 are connected to the input terminals of n respective inductors shown as 206(1)–206(n) (collectively the inductors 206). The output terminals of the inductors 206 are commonly connected to provide the output voltage (V-OUT) on the output line 112.

In addition, the multiphase controller 1002 provides a pair of rectangular wave voltages (MIN, MAX) to drive the gate terminals of the respective dedicated phase N-MOSFETs 1008, 1010. The source terminal of the N-MOSFET 1010 and the drain terminal of the N-MOSFET 1008 are commonly connected to the input terminal of a dedicated phase inductor 1006. The output terminal of the dedicated phase inductor 1006 is connected to the output line 112. A pair of catch diodes 1012, 1014 are also commonly connected to the input terminal of the dedicated phase inductor 1006. For example, an anode of the first catch diode 1012 is connected to the input terminal of the dedicated phase inductor 1006 and a cathode of the first catch diode 1012 is connected to the dedicated phase voltage source 1000. A cathode of the second catch diode 1014 is connected to the input terminal of the dedicated phase inductor 1006 and an anode of the second catch diode 1014 is connected to ground.

The output capacitor 108 is connected between the output line 112 and ground. The load resistance 110 is also connected between the output line 112 and ground. In one embodiment, the voltages V1-Vn at the input terminals of the respective inductors 206 are provided as feedback voltages to the multiphase controller 1002 to control current sharing between the phases. The output voltage (V-OUT) on the output line 112 is provided as an input to the multiphase controller 1002 for feedback and transient recovery.

In one embodiment, decoupling capacitors may be used at various locations to stabilize voltages by providing instantaneous current. For example, n decoupling capacitors shown as 1022(1)–1022(n) (collectively the decoupling capacitors 1022) are coupled between the respective voltage sources 200 and ground. The decoupling capacitors 1022 are placed near the respective top N-MOSFETs 1004. In another example, n decoupling capacitors shown as 1018(1)–1018(n) (collectively the decoupling capacitors 1018) are coupled between the output terminals of the respective inductors 206 and ground. The decoupling capacitors 1018 are placed near the respective inductors 206. In addition, a decoupling capacitor 1016 is coupled between the dedicated phase voltage source 1000 and ground. The decoupling capacitor 1016 is placed close to the N-MOSFET 1010. In one embodiment, the decoupling capacitor 1016 is selected to be relatively larger than the other decoupling capacitors. The decoupling capacitor 1016 provides instantaneous current for the transient recovery and using a relatively larger decoupling capacitor 1016 may improve the transient response of the multiphase switching regulator 1020.

The top N-MOSFETs 1004 and the bottom N-MOSFETs 208 function as switches that alternately connect the respective inductors 206 to the respective voltage sources 200 and ground. For example, when the voltages on the gate terminals of the top N-MOSFETs 1004 are relatively high with respect to their source terminals, the top N-MOSFETs 1004 conduct and connect the input terminals of the respective inductors 206 to the respective voltage sources 200. When the voltages on the gate terminals of the bottom N-MOSFETs 208 are high, the bottom N-MOSFETs 208 conduct and connect the input terminals of the respective inductors 206 to ground. The function of the top N-MOSFETs 204 can be implemented by P-MOSFETs with appropriate changes to the drivers in the multiphase controller 1002. The voltages on the gate terminals are timed so that the top N-MOSFETs 1004 and the bottom N-MOSFETs 208 connected to a particular inductor 206 are not conducting at the same time.

The N-MOSFETs 1008, 1010 of the dedicated transient phase also function as switches, connecting the dedicated phase inductor 1006 to ground or to the dedicated phase voltage source 1000. However, unlike the N-MOSFETs 1004, 208 of the other phases which switch synchronously, the N-MOSFETs 1008, 1010 of the dedicated transient phase switch asynchronously. For example, the other phases may switch between the voltage sources 200 and ground at relatively fix frequencies with variable duty cycles and phase shifts between the phases. The dedicated transient phase, on the other hand, does not operate at a predetermined frequency. The dedicated transient phase operates intermittently. The dedicated transient phase is active during transient conditions when the output voltage drops below a first predetermined threshold (e.g., output voltage undershoot) or rises above a second predetermined threshold (e.g., output voltage overshoot), and the dedicated transient phase is inactive during other operating conditions.

In one embodiment, the dedicated transient phase includes the N-MOSFET 1008 and the catch diode 1012 to suppress transient overshoots in the output voltage. For example, when the output voltage exceeds a first predetermined voltage indicating a change to a lower load current, the multiphase controller 1002 provides a minimum-load signal (MIN) to turn on the N-MOSFET 1008 providing a path to ground. The N-MOSFET 1008 temporarily drains the excess output current through the dedicated phase inductor 1006 until the other phases adjust to operation under the lower load current. For example, the N-MOSFET 1008 remains conductive until the output voltage is less than the first predetermined voltage. To avoid voltage spikes, the catch diode 1012 provides a current path when the N-MOSFET 1008 turns off.

In another embodiment, the dedicated transient phase includes the N-MOSFET 1010 and the catch diode 1014 to suppress transient undershoots in the output voltage. For example, when the output voltage is less than a second predetermined voltage indicating a change to a higher load current, the multiphase controller 1002 provides a maximum-load signal (MAX) to turn on the N-MOSFET 1010 providing a path to the dedicated phase voltage source 1000. The dedicated phase voltage source 1000 temporarily supplies the extra load current via the N-MOSFET 1010 and the dedicated phase inductor 1006 until the other phases adjust to operation under the higher load current. For example, the N-MOSFET 1010 remains conductive until the output voltage is higher than the second predetermined voltage. To avoid voltage spikes, the catch diode 1014 provides a current path when the N-MOSFET 1010 turns off.

In yet another embodiment, the dedicated transient phase includes both pairs of the N-MOSFETs 1008, 1010 and the catch diodes 1012, 1014 to suppress both transient overshoots and undershoots in the output voltage. The dedicated transient phase can decrease or increase the output current substantially instantaneously to minimize output voltage overshoots or undershoots. For example, circuitry controlling the dedicated transient phase reacts relatively quicker to output voltage changes than circuitry for the other phases. In addition, the dedicated phase inductor 1006 is advantageously smaller than the inductors 206 of the other phases to provide a quicker response. For example, the inductance of the dedicated phase inductor 1006 may be 100 nano-henries while the inductance of the other inductors 206 may be two micro-henries.

Figure 11:
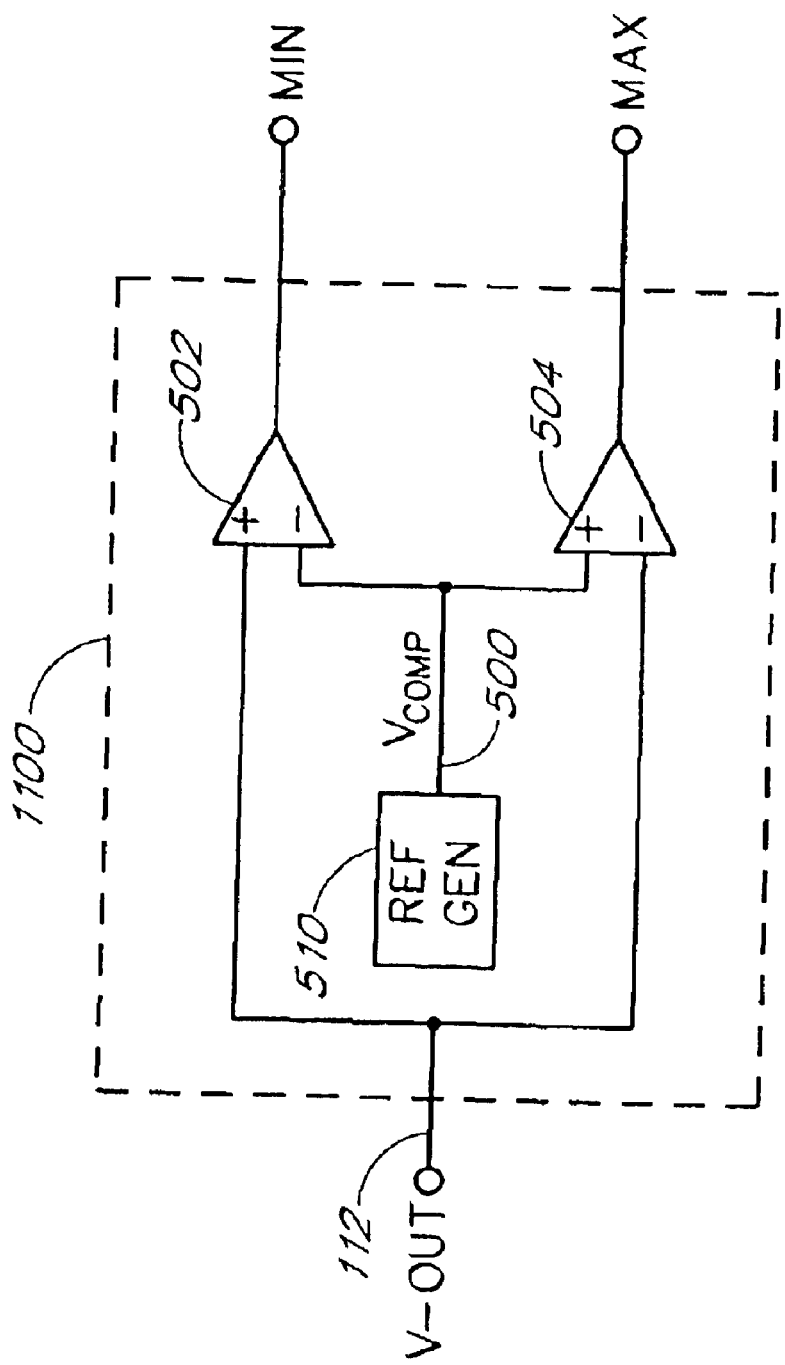
FIG. 11 is a block diagram of an alternate embodiment of a transient recovery circuit.

FIG. 11 is a block diagram of an alternate embodiment of a transient recovery circuit 1100. The transient recovery circuit 1100 controls the dedicated transient phase illustrated in FIG. 10. Similar to the transient recovery circuit 300 described in FIG. 5, the transient recovery circuit 1100 includes a comparing reference generator 510, an overshoot detector 502, and an undershoot detector 504.

The comparing reference generator 510 generates a comparing voltage (VCOMP) 500 which is provided to the inverting input of the overshoot detector 502 and to the non-inverting input of the undershoot detector 504. The output voltage (V-OUT) is provided as an input to the non-inverting input of the overshoot detector 502 and to the inverting input of the undershoot detector 504. When the output voltage is above the comparing voltage 500 by a first limit, the output of the overshoot detector 502 is high. When the output voltage is below the comparing voltage 500 by a second limit, the output of the undershoot detector 504 is high. Otherwise, the outputs of respective detectors are low.

The output of the overshoot detector 502 corresponds to the minimum-load signal (MIN) of the multiphase controller 1002. When the output of the overshoot detector 502 is high, the dedicated transient phase operates to decrease output current. For example, the output of the overshoot detector 502 is provided to the gate of the N-MOSFET 1008 which drains some of the excess output current to suppress an output voltage overshoot.

The output of the undershoot detector 504 corresponds to the maximum-load signal (MAX) of the multiphase controller 1002. When the output of the undershoot detector 504 is high, the dedicated transient phase operates to increase output current. For example, the output of the undershoot detector 504 is provided to the gate of the N-MOSFET 1010 which supplies additional current to the load to suppress an output voltage undershoot.

Figure 12:
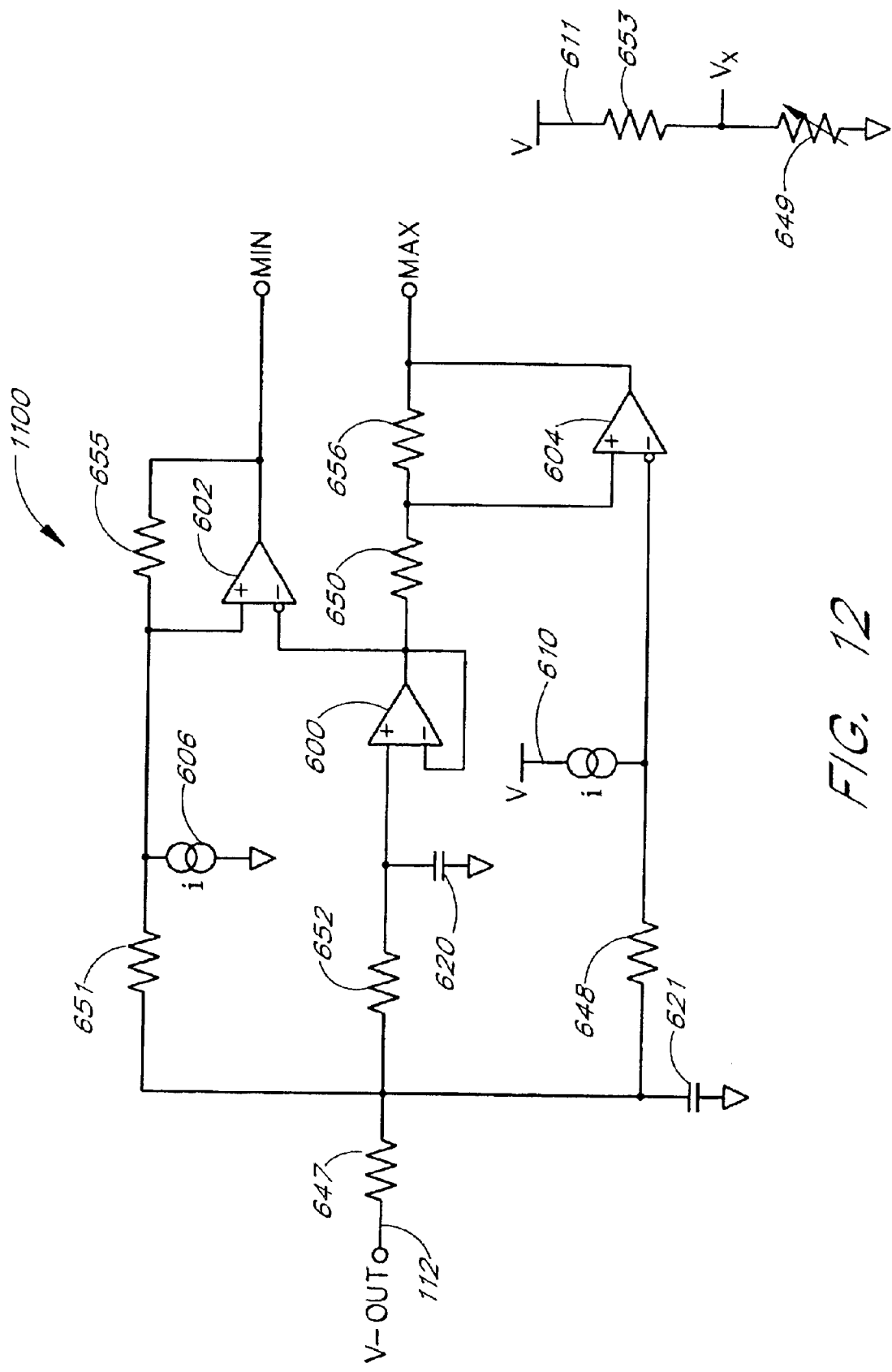
FIG. 12 is a schematic diagram of one embodiment of the transient recovery circuit shown in FIG. 11.

FIG. 12 is a schematic diagram of one embodiment of the transient recovery circuit 1100 shown in FIG. 11. The schematic diagram of FIG. 12 is a simplified version of the schematic diagram of FIG. 6 which is described above. The outputs (MIN, MAX) of the transient recovery circuit 1100 correspond to the outputs of the comparators 602, 604, eliminating subsequent components such as the series resistors 654, 657, the diode 612, and the NPN transistor 614 which are shown in FIG. 6.

Figure 13:
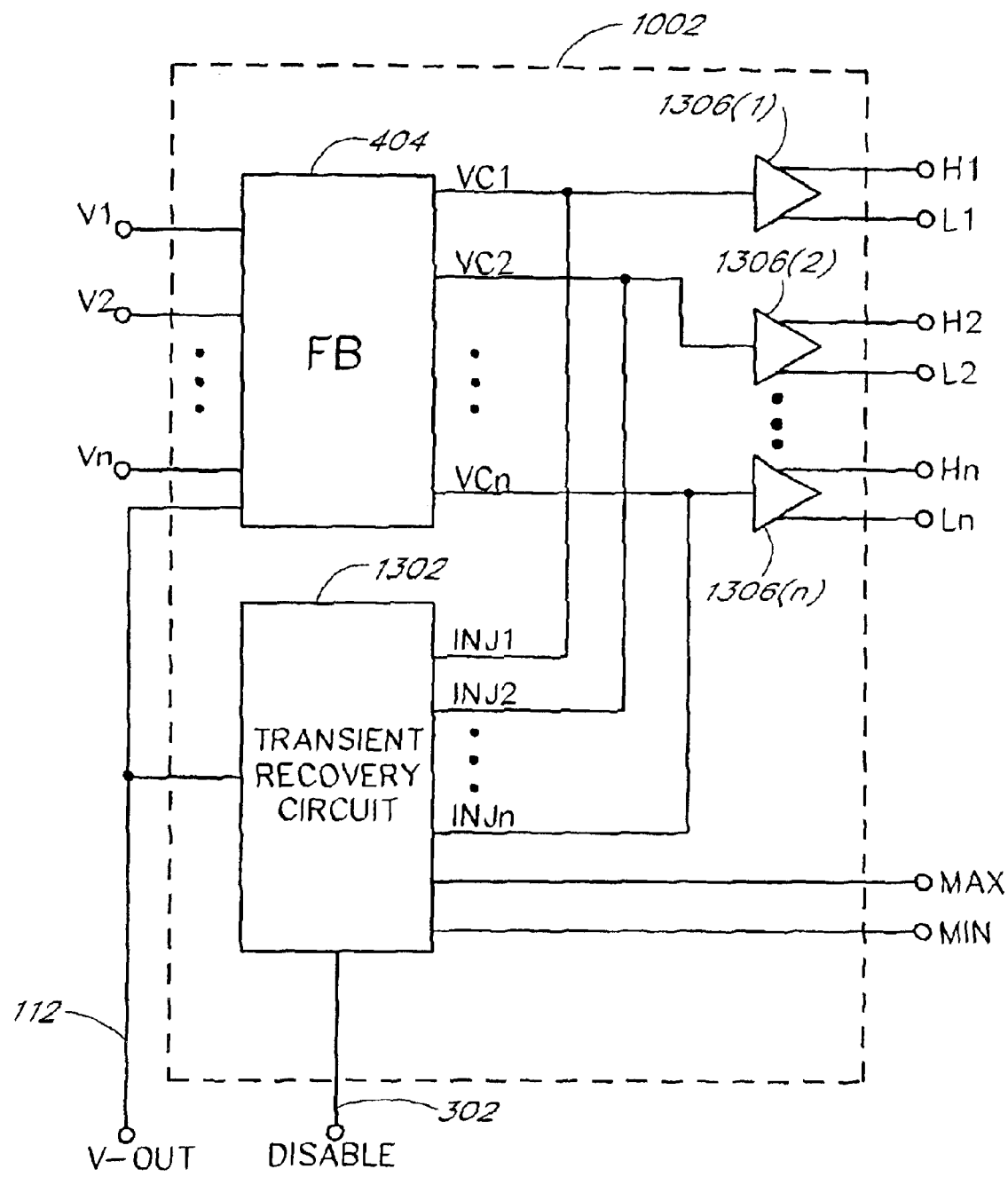
FIG. 13 is a block diagram of one embodiment of the multiphase controller shown in FIG. 10.

FIG. 13 is a block diagram of one embodiment of the multiphase controller 1002 shown in FIG. 10 which illustrates participation by one or more of the regular phases in transient recovery in addition to the dedicated transient phase. Participation by one or more of the regular phases in transient recovery increases the speed of transient correction and improves the reliability of the dedicated transient phase which can conduct transient currents for a shorter duration.

The block diagram of FIG. 13 is similar to the block diagram of the multiphase controller 202 shown in FIG. 4 with an additional pair of outputs (MAX, MIN) to control the dedicated transient phase. Similar to the multiphase controller 202 of FIG. 4, the multiphase controller 1002 includes a multiphase feedback (FB) circuit 404 and n PWM circuits shown as PWM circuits 1306(1)–1306(n) (collectively the PWM circuits 1306) in addition to the multiphase transient recovery circuit 1302.

The multiphase feedback circuit 404 receives the output voltage and n feedback voltages V1-Vn to generate n control voltages (VC1-VCn) for the respective PWM circuits 1306. In one embodiment, the feedback voltages establish forced current sharing among the multiple phases. The PWM circuits 1306 generate respective pairs of rectangular wave voltages (H1, L1 . . . Hn, Ln). In one embodiment, the rectangular wave voltages of each pair (H, L) are substantially inverse of each other. The rectangular wave voltages drive the respective switches 1004, 208 of the multiphase switching regulator 1020. The control voltages control the duty cycles of the switches in the multiphase switching regulator 1020.

The multiphase transient recovery circuit 1302 receives the output voltage (V-OUT) and generates n inject signals (INJ1-INJn) which are coupled to the respective control voltages at the inputs of the PWM circuits 1306. Similar to the transient recovery circuit 300, the inject signals override the control voltages (VC1-VCn) when the multiphase transient recovery circuit 1302 is active. When the multiphase transient recovery circuit 1302 is inactive, the inject signals float to thereby allow the control voltages to dominate the voltages at the inputs of the respective PWM circuits 1306. In addition, the multiphase transient recovery circuit 1302 generates control signals (MAX, MIN) for the dedicated transient phase.

The multiphase transient recovery circuit 1302 is active during rapid transient conditions in the output voltage (V-OUT) in response to changing load conditions. The multiphase feedback circuit 404 typically does not respond quickly to the transients since it is designed for a slow stable response to regulate the output voltage. By reacting relatively quickly to rapid transients in the output voltage, the multiphase transient recovery circuit 1302 suppresses overshoots or undershoots in the output voltage.

In one embodiment, the multiphase transient recovery circuit 1302 causes the PWM circuits 1306 of multiphase switching regulator 1020 to operate at maximum duty cycle in response to an undershoot and at minimum duty cycle in response to an overshoot. In addition, the multiphase transient recovery circuit 1302 outputs an active maximum-load signal (MAX) to the dedicated transient phase during the undershoot and an active minimum-load signal (MIN) to the dedicated transient phase during an overshoot. The undershoot in the output voltage indicates a change from a light load current to a heavy load current. The overshoot in the output voltage indicates a change from a heavy load current to a light load current. In another embodiment, the disable signal (DISABLE) disables the multiphase transient recovery circuit 1302 during power up or power down of the multiphase switching regulator 1020.

Figure 14:
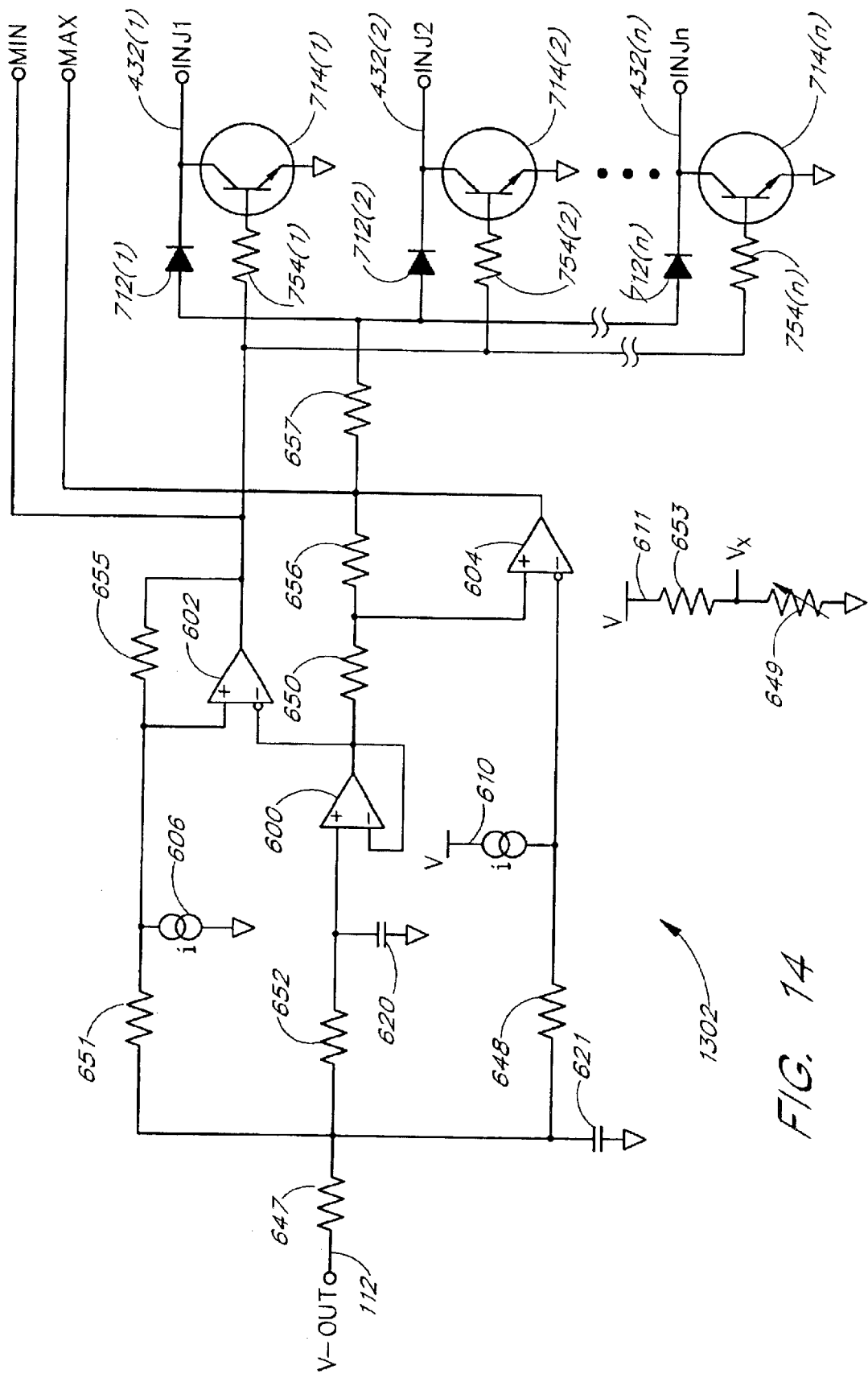
FIG. 14 is a schematic diagram of one embodiment of the multiphase transient recovery circuit shown in FIG. 13.

FIG. 14 is a schematic diagram of one embodiment of the multiphase transient recovery circuit 1302 shown in FIG. 13. The schematic diagram of FIG. 14 is substantially the schematic diagram of the multiphase transient recovery circuit 402 shown in FIG. 7 which is described above. The additional outputs (MIN, MAX) of the multiphase transient recovery circuit 1302 correspond to the outputs of the comparators 602, 604.

Although described above in connection with particular embodiments of the present invention, it should be understood that the descriptions of the embodiments are illustrative of the invention and are not intended to be limiting. Various modifications and applications may occur to those skilled in the art without departing from the true spirit and scope of the invention.

What is claimed is:

1. A method for responding to a transient output voltage in a multiphase switching regulator, the method comprising:
   comparing an output voltage with a plurality of reference voltages to generate a plurality of control voltages for respective phases of a multiphase switching regulator;
   detecting changes in output current;
   generating at least one inject signal when the output current changes by more than a predetermined amount within a predefined duration; and
   overriding at least one of the control voltages with the inject signal to operate at least one of the phases at a predetermined duty cycle during an output voltage transient.

2. The method of claim 1, wherein the reference voltages are feedback voltages from the respective phases and are used to control current sharing between the phases.

3. The method of claim 1, wherein changes in the output current are detected by sensing undershoots or overshoots in the output voltage.

4. The method of claim 1, wherein the multiphase switching regulator accepts one or more direct current voltage sources and outputs a desired direct current voltage to power a microprocessor.

5. A method of responding quickly to output transients for a multiphase switching regulator comprising:
   comparing an output voltage of the multiphase switching regulator to a reference comparing voltage;
   providing a reduced-load signal to turn on a first semiconductor switch in a dedicated phase of the multiphase switching regulator to drain a portion of the output current when the output voltage is greater than the reference comparing voltage; and
   providing an increased-load signal to turn on a second semiconductor switch in the dedicated phase of the multiphase switching regulator to provide additional output current when the output voltage is less than the reference comparing voltage.

6. The method of claim 5, wherein the dedicated phase uses an inductor of a smaller value than corresponding inductors of the other phases in the multiphase switching regulator.

7. The method of claim 5, wherein the reference comparing voltage corresponds to a steady-state operating output voltage of the multiphase switching regulator.

8. The method of claim 7, wherein the reference comparing voltage automatically updates to reflect a new operating output voltage.

9. The method of claim 5, wherein a pulse-width modulation circuit normally controls switching operations of the multiphase switching regulator.

10. A switching regulator comprising:

means for bypassing a feedback circuit of the switching regulator in response to an overshoot in an output voltage of the switching regulator by operating the switching regulator at a first predetermined duty cycle; and means for alternately bypassing the feedback circuit in response to an undershoot in the output voltage of the switching regulator by operating the switching regulator at a second predetermined duty cycle.

* * * * *